(12) United States Patent
Budnicki et al.

(10) Patent No.: US 11,205,883 B2
(45) Date of Patent: Dec. 21, 2021

(54) DISPERSION ADJUSTMENT UNITS AND METHODS OF USE

(71) Applicant: TRUMPF LASER GMBH, Schramberg (DE)

(72) Inventors: Aleksander Budnicki, Gundelfingen (DE); Raphael Scelle, Villingen-Schwenningen (DE)

(73) Assignee: TRUMPF LASER GMBH, Schramberg (DE)

( * ) Notice: Subject to any disclaimer, the term of this patent is extended or adjusted under 35 U.S.C. 154(b) by 67 days.

(21) Appl. No.: 16/220,380

(22) Filed: Dec. 14, 2018

(65) Prior Publication Data
US 2019/0123504 A1 Apr. 25, 2019

Related U.S. Application Data

(63) Continuation of application No. PCT/EP2017/064228, filed on Jun. 12, 2017.

(30) Foreign Application Priority Data

Jun. 15, 2016 (DE) .......................... 102016110947.9

(51) Int. Cl.
*H01S 3/00* (2006.01)
*H01S 3/10* (2006.01)
*B23K 26/064* (2014.01)

(52) U.S. Cl.
CPC .......... *H01S 3/0057* (2013.01); *B23K 26/064* (2015.10); *H01S 3/0014* (2013.01); *H01S 3/1003* (2013.01); *H01S 3/10053* (2013.01)

(58) Field of Classification Search
CPC ...... G02B 5/1861; G02B 5/1866; G02B 5/04; G02B 27/283; G02B 27/44; G02B 27/142;
(Continued)

(56) References Cited

U.S. PATENT DOCUMENTS

| 5,499,134 A | 3/1996 | Galvanauskas et al. |
| 6,272,156 B1 | 8/2001 | Reed et al. |

(Continued)

FOREIGN PATENT DOCUMENTS

| DE | 19531059 | 2/1996 |
| DE | 102010018967 | 11/2011 |

(Continued)

OTHER PUBLICATIONS

English translation of DE102010018967 machine translated on Jul. 27, 2020.*

(Continued)

*Primary Examiner* — Jie Lei
(74) *Attorney, Agent, or Firm* — Fish & Richardson P.C.

(57) ABSTRACT

The invention relates to dispersion adjustment units for electromagnetic radiation having a spectral width, e.g., for laser pulses. The dispersion adjustment unit includes at least one dispersive element for producing angular dispersion in an angular dispersion region limited by two interaction regions of the electromagnetic radiation with the at least one dispersive element. In the angular dispersion region, individual spectral components of the electromagnetic radiation are associated with optical paths extending at an angle to one another. Furthermore, the dispersion adjustment unit includes an optical unit that is arranged in the angular dispersion region and includes an optical element that transmits the electromagnetic radiation. The optical element effects an incidence-angle-dependent parallel offset of the individual spectral components of the electromagnetic radiation with respect to the propagation of the individual spectral components before and after the optical unit.

28 Claims, 11 Drawing Sheets

(58) Field of Classification Search
CPC . H01S 3/00; H01S 3/10; H01S 3/0057; H01S 3/0014; H01S 3/1003; H01S 3/10053; B23K 26/064
USPC .... 359/577, 569, 566, 584, 238, 337.5, 349, 359/615; 372/25, 30, 99, 102; 398/189, 398/191, 199
See application file for complete search history.

(56) References Cited

U.S. PATENT DOCUMENTS

| | | |
|---|---|---|
| 7,729,045 B2 | 6/2010 | Moro et al. |
| 7,822,347 B1 | 10/2010 | Brennan, III et al. |
| 8,780,440 B2 | 7/2014 | Bayramian et al. |
| 2002/0023903 A1 | 2/2002 | Ngoi et al. |
| 2006/0159137 A1 | 7/2006 | Shah |
| 2008/0304127 A1 | 12/2008 | Resan et al. |
| 2011/0026105 A1 | 2/2011 | Bayramian et al. |
| 2011/0069388 A1 | 3/2011 | Hoof et al. |
| 2011/0122484 A1 | 5/2011 | Gaudiosi et al. |
| 2011/0242646 A1 | 10/2011 | Schimpf et al. |
| 2011/0255563 A1 | 10/2011 | Heyne et al. |
| 2013/0021668 A1 | 1/2013 | Kaplan et al. |
| 2014/0139921 A1 | 5/2014 | Tournois et al. |

FOREIGN PATENT DOCUMENTS

| | | |
|---|---|---|
| EP | 2933882 | 10/2015 |
| JP | 2000187167 | 7/2000 |
| WO | WO 2010/028837 | 3/2010 |
| WO | WO 2015/117128 | 8/2015 |

OTHER PUBLICATIONS

International Preliminary Report on Patentability in International Application No. PCT/EP2017/064228, dated Dec. 27, 2018, 20 pages (with English translation).
International Search Report and Written Opinion in International Application No. PCT/EP2017/064228, 24 pages (with English translation).
Office Action German Application No. 102016110947.6, dated Dec. 1, 2016, 7 pages (with English translation).
CN Office Action in Chinese Appln. No. 201780037328.2, dated Jul. 22, 2020, 20 panes (with English translation).
KR Office Action in Korean Appln. No. 10-2019-7000884, dated Apr. 28, 2021, 8 pages (English translation).
CN Office Action in Chinese Appln. No. 201780037328.2, dated Mar. 16, 2021, 8 pages (Englishi translation).
JP Japanese Office Action in Japanese Appln. No. 2018-565311, dated Jun. 8, 2021, 11 pages.

* cited by examiner

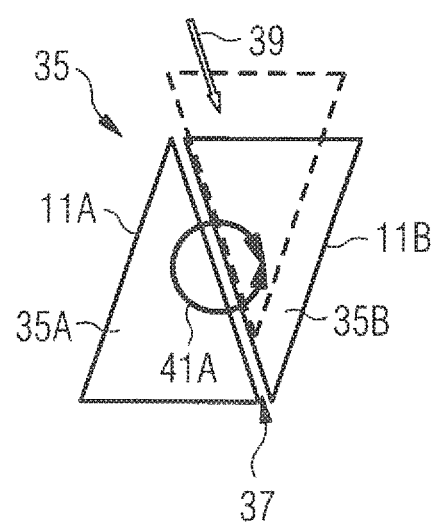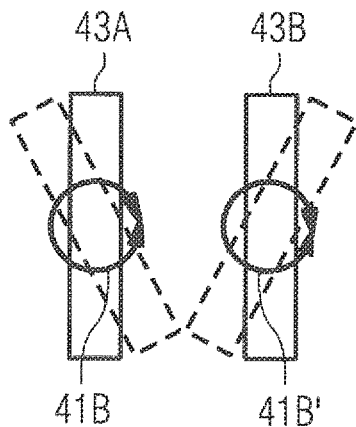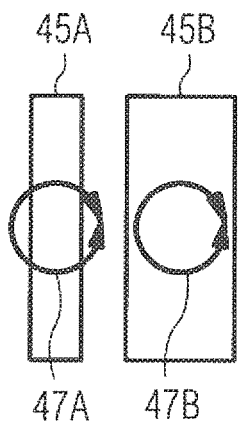

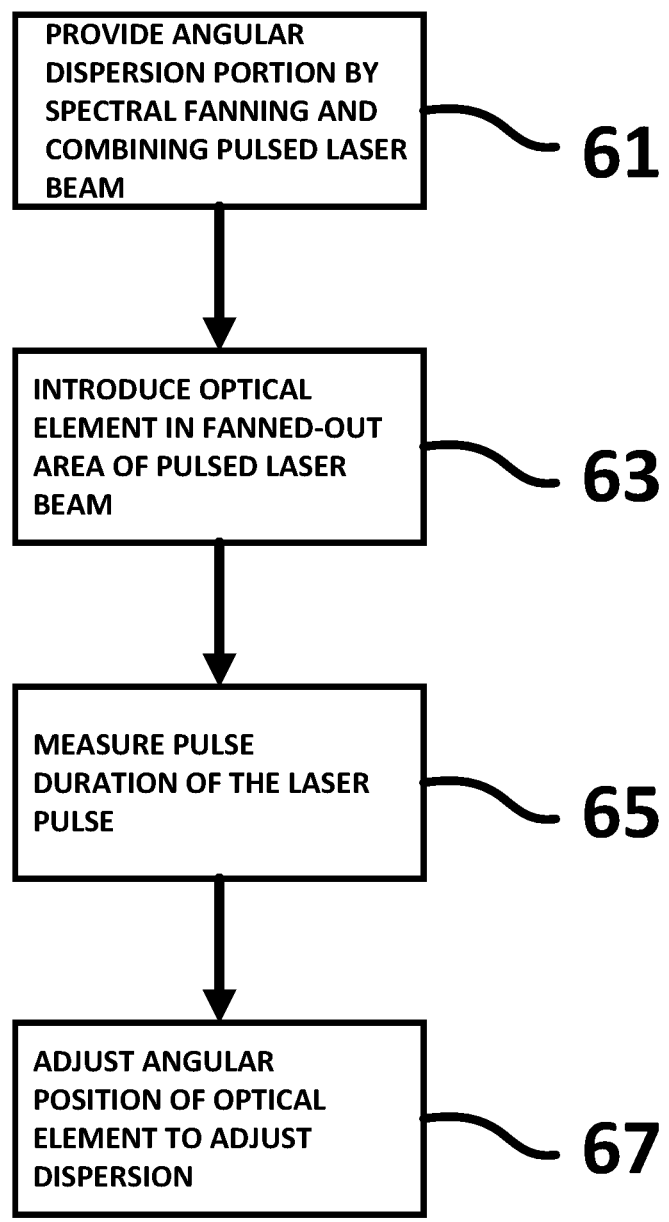

US 11,205,883 B2

DISPERSION ADJUSTMENT UNITS AND METHODS OF USE

CROSS REFERENCE TO RELATED APPLICATIONS

This application is a continuation of and claims priority under 35 U.S.C. § 120 from PCT Application No. PCT/EP2017/064228 filed on Jun. 12, 2017, which claims priority from German Application No. DE 10 2016 110 947.9, filed on Jun. 15, 2016. The entire contents of each of these priority applications are incorporated herein by reference.

TECHNICAL FIELD

The present disclosure relates to units for dispersion adjustment in pulsed laser systems with a pulse compressor unit and/or a pulse stretcher unit. Furthermore, the present disclosure relates to methods for fine-tuning the dispersion in such dispersion adjustment units.

BACKGROUND

Laser pulses have a spectral width that determines the achievable minimum duration of the laser pulses. The wider the underlying frequency spectrum, the shorter the pulse duration of the laser pulse can be. However, in general the dispersion of the material passed through (herein referred to as material dispersion) and possibly a self-phase modulation at high peak powers leads to dispersion of the spectral components. Thus, in particular for short and ultrashort laser pulses with pulse durations in the ps range and shorter, usually a dispersion adjustment of the optical path is carried out if the divergence of the laser pulses is to be prevented or reversed. Optical set-ups, which counteract a dispersive widening of the pulse duration, are referred to as pulse compressor units. Examples of such dispersion adjustment units include, for example, grating pair-based or prism pair-based compressor units (in short: grating or prism compressors) that use a fanning out of the spectral components of the laser pulse, herein referred to as angular dispersion, to generate different optical path lengths.

Moreover, amplified pulses in particular can lead to high intensities that can cause non-linear effects such as self-focusing, e.g., in the amplifier laser medium. Accordingly, amplifier configurations are designed such that either an actively stretched laser pulse is amplified or the pulse extension occurs during the amplification process. Optical set-ups of such dispersion adjustment units, which cause a dispersive widening of the pulse duration of a laser pulse, are herein referred to as pulse stretching units. Examples of such dispersion adjustment units include, for example, grating pair-based or prism pair-based stretching units (in short: grating or prism "stretchers") having, for example, an integrated lens system that uses an angular dispersion, followed by a pulse compressor unit. Furthermore, a laser pulse can be guided, for example, through a material with corresponding dispersive properties for pulse broadening, for example, through optical fibers, possibly with integrated (chirped) fiber Bragg gratings.

A basic parameter for grating or prism compressors and grating or prism stretchers is the extent of spectral fanning-out. This depends, for example, on the grating constant of the grating used or the refractive index of the prism used. In general, the dispersion can be adjusted by the distance between the gratings or prisms, which determines the differences in path length caused by the angular dispersion. In the case of grating compressors or grating stretchers, the phase accumulated by diffraction, for example, contributes to the dispersion. In general, the better the dispersion can be compensated, the closer the pulse duration can approach the spectrally achievable pulse duration. The shorter the pulse duration, the more orders of dispersion have to be taken into account for compression. Furthermore, one can use thin glass plates positioned in the beam path for fine adjustment, which make the dispersion properties of the beam path adjustable by material dispersion.

In general, the above concepts of pulse stretching and pulse compression are used for the so-called CPA (chirped pulse amplification) to generate ultrashort pulses with high pulse energies. For example, to generate (ultra-) short pulses with a fiber laser system, an input laser pulse of a fiber laser is typically temporally stretched (e.g., in a fiber-based stretcher or in a grating stretcher), amplified in a fiber amplifier unit, and then temporally compressed (e. g., in a grating compressor). Similar set-ups for generating (ultra-) short pulses can be based on disk laser systems in machine tools, for example. Typically, very precise and technically sophisticated compression is required to reverse the dispersion of the spectral components.

In the state of the art, various approaches for precise dispersion control, e.g., in grating compressors, are known. For example, WO 2015/117128 A1 and U.S. Pat. No. 7,822,347 B1 disclose concepts in which the change in pulse duration is controlled via the grating spacing of the stretcher or compressor and is additionally fine-tuned using a "chirped" FBG (Fiber Bragg Grating). Further approaches are known from U.S. Pat. No. 7,729,045 B2 and U.S. Pat. No. 8,780,440 B2. Furthermore, DE 10 2010 018967 A1 discloses an OPO system with dispersion compensation based on material dispersion in which one or two glass plates are positioned in the beam path. Further, US 2008/0304127 A1 discloses a pulse shaper with an SLM, U.S. Pat. No. 6,272,156 B1 discloses the use of a stretcher-compressor set-up in an optical fiber-based guiding of a pulsed laser beam, US 2011/0255563 A1 discloses a pulse shaper for a laser system, and US 2006/0159137 A1 discloses a pulsed laser system with a grating compressor.

SUMMARY

In general, this disclosure provides an extended dispersion adjustment for, e.g., grating pair-based and prism pair-based dispersion adjustment units. A further aspect of the disclosure provides dispersion adjustment for such dispersion adjustment units, which has as little effect as possible on the beam quality and the beam path after the dispersion adjustment unit, and in particular, provides an easily controllable setting of an optical component.

In one aspect, a dispersion adjustment unit for electromagnetic radiation having a spectral width, in particular for laser pulses, includes an arrangement with at least one dispersive element for generating angular dispersion in an angular dispersion region delimited by two interaction regions of the electromagnetic radiation with the at least one dispersive element, wherein, in the angular dispersion region, individual spectral components of the electromagnetic radiation are associated with optical paths, which run at an angle to one another. Furthermore, the dispersion adjustment unit includes an optical unit that is arranged in the angular dispersion region and has an optical element that transmits the electromagnetic radiation. The optical element produces an incidence-angle-dependent parallel offset of the individual spectral components of the electromagnetic radiation with respect to the propagation of the individual spectral components before and after the optical unit.

In another aspect, a dispersion adjustment unit for electromagnetic radiation having a spectral width, in particular for laser pulses, includes at least one pair of dispersive elements for generating angular dispersion. The pair of dispersive elements is arranged in such a way that between the dispersive elements of the pair of dispersive elements individual spectral components are associated with optical paths running at an angle to each other. The dispersion adjustment unit further includes an optical element disposed in the beam path between the dispersive elements and rotatably supported for adjusting the angular position of the optical element with respect to the beam path.

In another aspect, the disclosure provides laser systems that include a laser pulse source for generating spectrally wide laser pulses and a pulse stretching or pulse compressing, or both, and including at least one dispersion adjustment unit as described above.

Furthermore, the laser systems can include a control unit and a pulse duration measuring device for outputting a pulse duration-dependent measurement signal to the control unit. Thereby, the control unit is configured, for example, for setting the angular position of the optical element with respect to the beam path as a function of the pulse duration-dependent measurement signal.

In another aspect, the disclosure provides methods for dispersion adjustment for laser pulses that include: providing an angular dispersion portion by spectrally fanning out and combining a pulsed laser beam in an angular dispersion region; providing an optical element in the angular dispersion region, wherein the optical element provides propagation directions in the optical element dependent on an incidence angle of spectral components with respect to an incidence surface of the optical element; and changing the propagation direction and/or the propagation length in the optical element, thereby influencing the angular dispersion portion, in particular while maintaining the propagation directions of spectral components.

For example, the introduction of a rotatable glass plate (as an example of an optical element transmitting electromagnetic radiation) into the spectrally fanned-out region of a set-up of at least one dispersive element results in additional parameters of the dispersion setting of the associated dispersion adjustment unit. The spectrally dependent angle of incidence on the glass plate leads to different path lengths in the glass plate for the different spectral components and to a different beam path after the glass plate. In particular, there is formed an incidence-angle-dependent parallel offset of the individual spectral components. Thereby, the spectral dependence of the refractive index and, thus, of the change of the material dispersion, is almost negligible in comparison to the change of the dispersion due to the changed parallel offset.

With the rotatable glass plate, the temporal compression of a laser pulse in a (e.g., grating/prism/grism) compressor can be modified.

To adjust the dispersion, the glass plate is rotatably mounted and controlled, for example, via a control unit. Such an arrangement can be implemented with little or no influence on the beam quality. In general, the thickness of the glass plate (generally the optical element for dispersion adjustment) can be used to select the adjustment range or the sensitivity of the dispersion modification given by the rotation.

Similar effects on the optical path of individual spectral components during dispersion adaptation can also be achieved using an optical element including a double wedge structure, and/or an electro-optical modulator, and/or two acousto-optical modulators.

A prerequisite for the wavelength/incidence angle-dependent modification of the angular dispersion is generally that a refractive index change is provided in an optical unit. For implementation in air/nitrogen, the refractive index of the optical element shall not be equal to 1, to provide a refraction that depends on the angle of incidence.

In the case of, for example, a folded grating compressor with double passage, a plane-parallel plate has the advantage of minimizing the influence on the beam quality. However, in an unfolded grating compressor, an optical unit with an optical element can also be provided only on one side, if, for example, the stretching or compression is small and, accordingly, the effects on the beam quality in the asymmetrical beam path remain low.

The optical element preferentially has a geometry that displaces in parallel the direction of an incident (monochrome) beam—assuming a non-perpendicular incidence.

Thereby, the propagation directions of the individual spectral components in the spectrally divergent region before and after the optical element remain the same, so that the angular relation between the beam paths of the individual spectral components is maintained, but the degree of fanning out can be varied.

The optical element is transparent in the spectral range used and generally has plane-parallel incident and exit surfaces. For example, the optical element can be a plane-parallel quartz plate or a system of optical elements that provides plane-parallel incident and exit surfaces. For example, the incident and/or exit surfaces can have an anti-reflective coating to avoid power losses and interferences.

In addition, the optical unit can have two glass plates (as optical elements) that can be rotated towards each other, for example, so that if the glass plates are aligned appropriately, a zero position, which is free of a beam offset, can be implemented in which essentially only the material dispersion of the glass plates contributes to the dispersion properties of the dispersion adjustment units. The optical unit may furthermore include a thin plate for fine-tuning and a thick plate for a rough adjustment of the dispersion properties.

The concepts and embodiments disclosed herein have the following advantages. The pulse duration can be set independently of or in addition to a movement of one of the dispersive elements (e.g., displacement of the second grating in a grating compressor for distance adjustment). For example, in the case of a grating compressor, the beam quality is very sensitive to the orientation of the grating structures. Therefore, the adjustment of the pulse duration requires a very complex grating holder, which should be able to be moved very precisely without influencing the orientation of the grating structure.

Furthermore, one can select the sensitivity of the dispersion adjustment, and, thus, the fine adjustment of the pulse duration of the laser pulses, to the rotation of the plate via the material thickness of the optical element, e.g., a plane-parallel plate of a few millimeters or centimeters. For example, the material thickness can be selected so that a compressor set-up is as stable as possible and/or the pulse duration can be actively adjusted or varied by rotating the optical element using a motor or piezo element. In general, the material thickness is selected according to the desired adjustment range, whereby small angular changes have a greater effect for a thick optical element than for a thin optical element. In addition, a double wedge configuration, for example, can make an initial thickness of the optical element adjustable. In a double wedge configuration, at least one of the wedges can also be moved independently of the dispersive element, such as the grating/prism/grism (or the gratings/prisms/grisms) of a compressor or stretcher.

In general, the concepts proposed herein make it possible to reduce the installation space required for a dispersion adjustment unit. Furthermore, the dispersion can also be adjusted without a translational movement of a dispersive element (e.g., grating, prism, or grism), so that, in particular, only a small influence, if any, is exerted on the beam path when adjusting the dispersion.

Herein, concepts are disclosed that allow to at least partly improve aspects of the prior art. In particular, additional features and their usefulness result from the following description of embodiments on the basis of the drawings.

DESCRIPTION OF DRAWINGS

FIGS. 8A-8C are schematics of exemplary designs of optical units with several rotatable optical elements for dispersion adjustment units as disclosed herein.

FIG. 9 is a flow diagram of a method for dispersion adjustment as described herein.

DETAILED DESCRIPTION

Aspects described herein are based, in part, on the realization that there are additional possibilities for influencing the dispersion properties by intervening in the angularly dispersive fanned-out propagation section of a grating, prism, or grism compressor (or stretcher), for example. Thereby, it was further recognized that the angular dispersion can be modified by a parallel offset of the individual spectral components that depends on the incidence angle.

In the following, with reference to FIG. 1, the concept for dispersion adjustment for an ultra-short pulse system—exemplary for laser systems that usually apply a dispersion adjustment—is described using a dispersion adjustment unit for pulse duration compression that is based on a rotatable glass plate.

Figure 1:
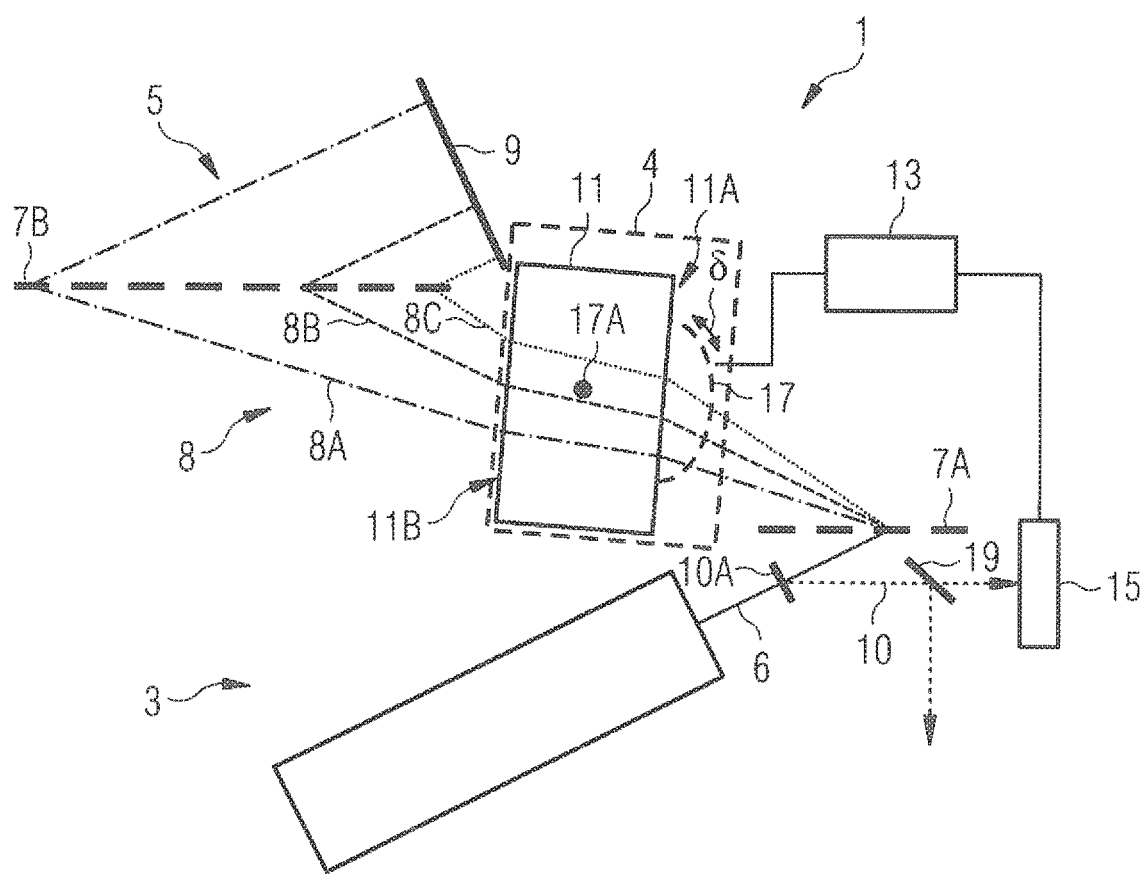
FIG. 1 is a schematic illustration of a laser system with a dispersion adjustment unit based on a rotatable glass plate for pulse duration compression (compressor) as described herein.

In FIG. 1, an ultrashort pulse system 1 includes a laser pulse source 3 for generating spectrally wide laser pulses and a dispersion adjustment unit 5 for pulse duration compression, which includes an optical unit 4 described below. The laser pulse source 3 can be configured, for example, as a laser oscillator or laser oscillator-amplifier combination. Furthermore, a similar dispersion adjustment unit (see, e.g., FIG. 7) can be integrated in the laser pulse source 3 within the context of pulse stretching.

In the ultrashort pulse system 1, laser pulses with spectral widths of, e.g., 1 nm and larger, and pulse energies of, e.g., 0.1 µJ and larger, are fed to the dispersion adjustment unit 5 as an input beam 6. The spectral width of the laser pulses requires a dispersion adjustment of the beam path to provide, at a target location, a certain pulse shape (intensity curve) of the laser pulses with a desired pulse duration, e.g., a shortest possible pulse duration or a pulse duration adapted to a processing method.

The dispersion adjustment unit 5 is configured in this example as a folded grating compressor. The grating compressor includes a pair of dispersive elements embodied as a first grating 7A and a second grating 7B, which provide two interaction regions of the gratings with the laser radiation. The spectrally dependent diffraction conditions generate an angular dispersion after the first grating 7A. I.e., in an angular dispersion region 8 between the dispersive elements (gratings 7A and 7B), the optical paths for the individual spectral components run in a fanned-out plane at an angle to each other.

FIG. 1 shows three optical paths 8A, 8B, and 8C of the beam path for a central wavelength $\lambda_0$ as well as a longer ($\lambda > \lambda_0$) and a shorter ($\lambda < \lambda_0$) wavelength. The optical paths 8A, 8B, and 8C of the different wavelengths run in a fan-out area 8 at an angle to each other. The second grating 7B causes an alignment/parallelization of the optical paths 8A, 8B, and 8C towards a reflector element 9 that causes a folding. The reflector element 9 is, for example, a deflection prism or a roof mirror, so that the return path experiences the same optical conditions, but is displaced in height, for example, in order to enable a separation of the compressed laser pulses of an output beam 10 from the input beam 6 at a pick-up mirror 10A. In FIG. 1, the dispersive elements 7A, 7B are exemplarily configured as transmission gratings. Alternatively, reflection gratings, prisms, or grisms can be used.

According to the concepts disclosed herein, the dispersion adjustment unit 5 includes the optical unit 4, which provides an additional parameter for adjusting the dispersion. In the embodiment shown in FIG. 1, the optical unit 4 includes a transmitting plane-parallel plate 11 as an optical element, for example. The optical element, i.e., the plate 11, can be made of quartz, YAG, sapphire, or SF 10, for example. The optical element is arranged between the first grating 7A and the second grating 7B in the fan-out area 8. FIG. 1 shows the plate 11 oversized to be able to show more clearly how the optical paths extend. Due to the spectral fanning, the individual wavelengths fall at different angles onto an incidence surface 11A of the plate 11, pass through the plate 11 on different optical paths, and exit at an exit surface 11B at different distances from each other, whereby the angle relation between the wavelengths is maintained for a plane-parallel plate. Accordingly, the plate 11 causes an incidence angle dependent parallel offset of the individual spectral components of the laser radiation with respect to the propagation of the individual spectral components before and after the plate 11. In FIG. 1, the directions of the optical paths 8A, 8B, and 8C are set correspondingly with gratings 7A, 7B arranged parallel to one another.

The optical unit 4 can also include an angle adjustment device 17 to adjust the angular position of the plate 11 relative to a rotary axis 17A. The laser system 1 can further include a control unit 13 and a pulse duration measuring device 15 for controlling the angle adjustment device 17.

It can be seen that a rotation of the plate 11 changes the optical paths in the plate 11 and the distances between the wavelengths at the exit surface 11B. Accordingly, the rotation influences the dispersion properties of the dispersion adjustment unit 5, so that the pulse duration of the laser pulses in the output beam 10 can be set by rotating the plate 11.

Using the dispersion adjustment unit 5 described in connection with FIG. 1, the pulse duration could be varied between 200 fs and 1 ps with a plane-parallel glass plate of about 1.5 mm thickness without significantly reducing the beam or pulse quality. The adjustment was more reproducible and more convenient than the conventional adjustment by adjusting the distance between the compressor gratings 7A, 7B. The variation of the pulse duration is not limited to the range 200 fs to 1 ps, but can be selected inter alia by the thickness and the material of the glass plate (for a given adjustment range of the rotation angle $\delta$).

In the following, the functional principle is summarized in general, but exemplarily with reference to the configuration shown in FIG. 1. The person skilled in the art can transfer by analogy the functional principle to the alternative configurations described below within the framework of this disclosure. Due to the diffraction at the first grating 7A, the different spectral components fall onto the plate 11 at different angles. Thereby, when rotating the plate 11, the phase difference between the spectral components changes by several effects:
1. The path in the optical unit (e.g., in the plate 11) differs for the different spectral components. This leads to different optical path lengths (the dependence of the refractive index on the wavelength is negligible in most configurations) and, thus, leads to a phase difference. In the case of the plate 11, the phase difference depends, for example, on the orientation of the plate 11 in the beam path; i.e., the phase difference generally depends on the angle of incidence onto the plate 11 of a central wavelength, for example.
2. Due to the different angles of incidence, the spectral components experience a beam offset of different magnitude when exiting the plate 11. Thereby, the following can change when the plate 11 is rotated:
   a) the path length between the plate 11 and the second interaction area (incidence area on the grating 7B) for the different spectral components,
   b) the size (i.e., the fanning out) of the beam at the second interaction region (incidence area at the grating 7B) and, thus, the phase contribution of the second dispersive element (grating 7B), and
   c) the path length between the second dispersive element (grating 7B) and the reflector element 9 for the different spectral components.

Figure 2A:
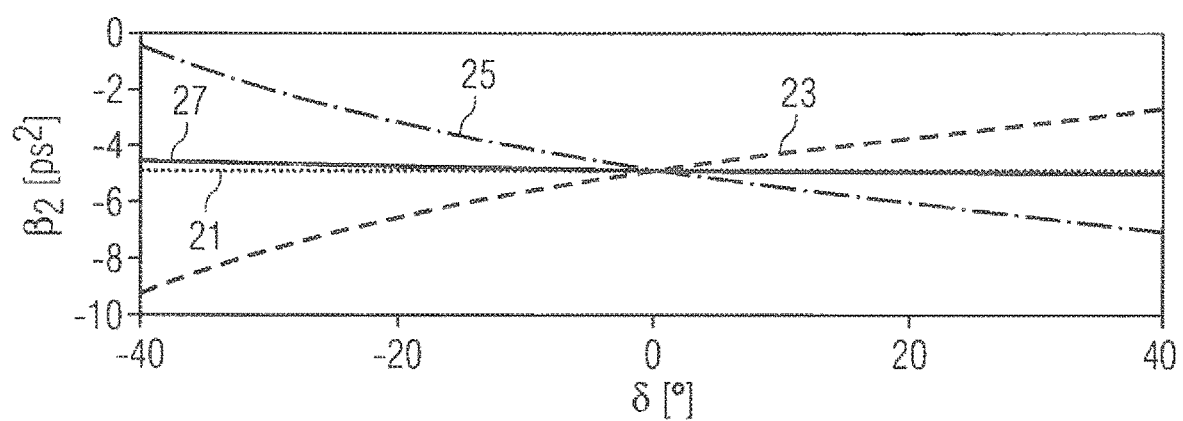
FIGS. 2A-2B are graphs that show exemplary calculations of rotation angle dependent dispersion contributions.
Figure 2B:
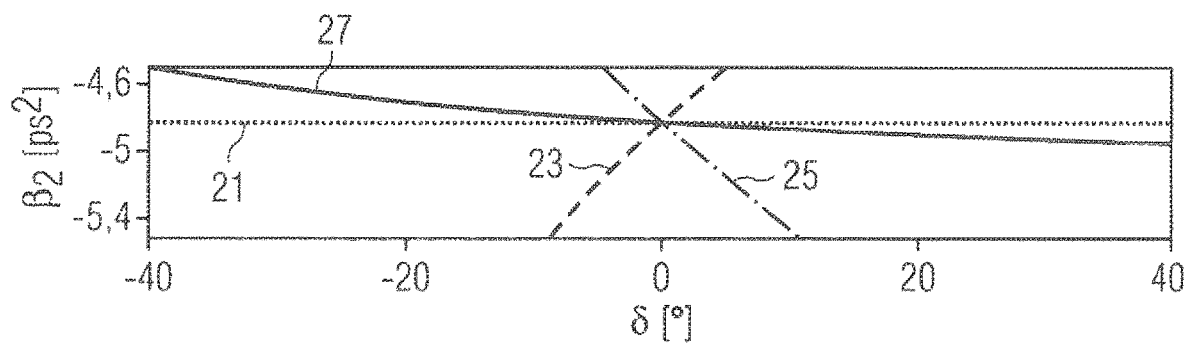
Figure 3A:
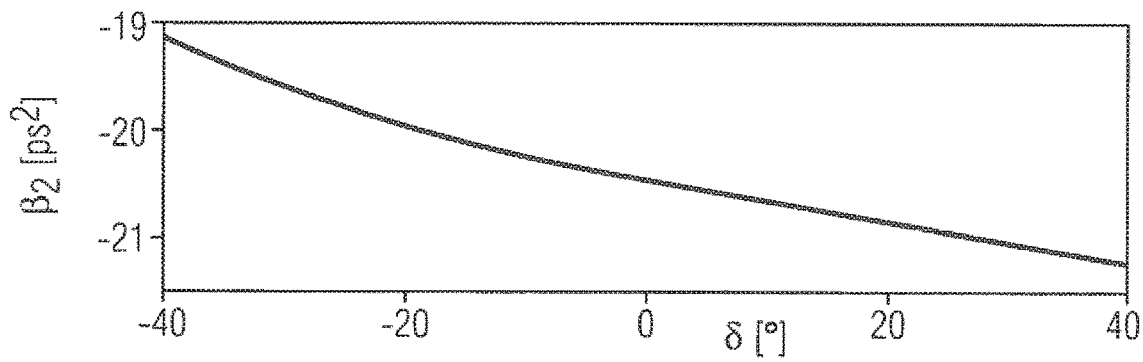
FIGS. 3A-3D are graphs that show exemplary calculations of rotation angle dependent dispersion orders for a small grating constant.
Figure 3B:
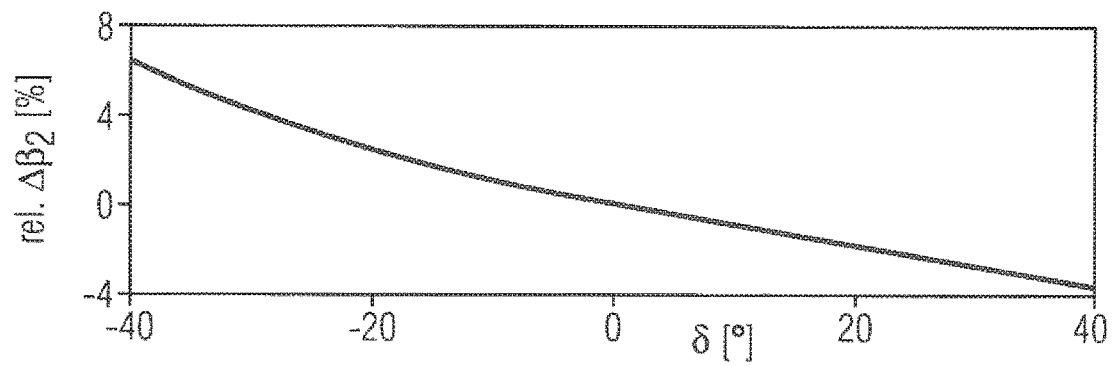
Figure 3C:
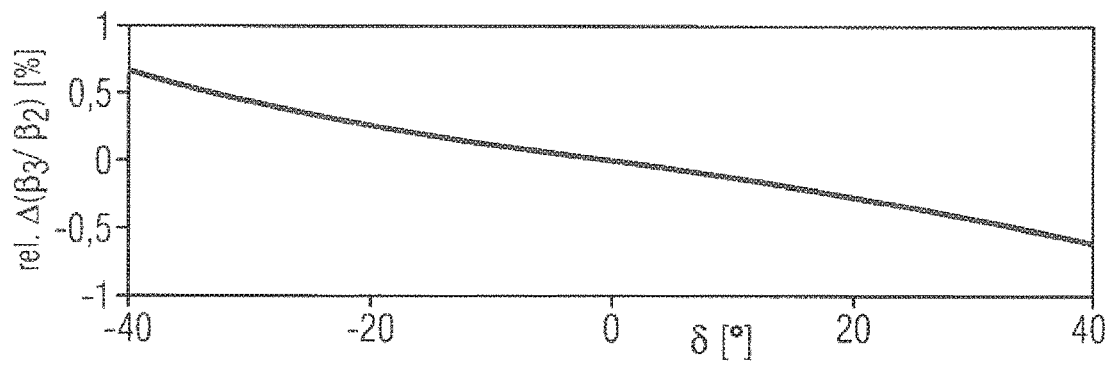
Figure 3D:
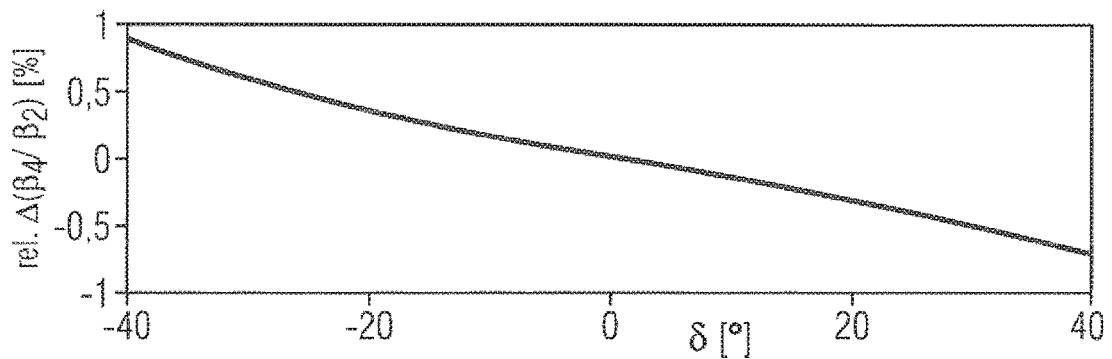

The contributions of these effects to the phase difference between the different spectral components or the contributions of the dispersion are shown for a glass plate in FIGS. 2A and 2B. FIGS. 2A and 2B illustrate the $\beta_2$-coefficients of the phase ($\phi=\beta_0+\beta_1*(\omega-\omega_0)+\beta_2/2*(\omega-\omega_0)^2+\ldots$), taking into account the above explained contributions to the functional principle. The $\beta_2$-coefficient is given as a function of the rotation angle of the glass plate, whereby FIG. 2B shows the contributions in an enlarged manner around the 0°-position of the glass plate. In the 0°-position, the central wavelength falls onto the glass plate orthogonal (angle of incidence 0°). The values given correspond to a set-up with a vertical grating distance $l_{grating}$ of 50 mm, a plate thickness of 10 mm, and a grating constant of 588 nm. In FIGS. 2A and 2B, the graphs are assigned to the contributions as follows:

21 (dotted line): Compressor without plate, whereby the distance of the compressor gratings is adapted so that $\beta_2$ is as large as with the plate at a rotation angle $\delta$ of the 0°-position.

23 (dashed line): There is included the contribution of the plate to the phase for the path between the gratings according to points 1) and 2a) of the functional principle.

25 (dashed dotted line): There is included the contribution of the plate to the phase for the path between the gratings and the contribution of the second grating according to points 1), 2a), and 2b) of the functional principle.

27 (solid line): There are included all contributions of the plate according to points 1), 2a), 2b), and 2c) of the functional principle.

It can be seen that all contributions are relevant for the dispersion adjustment in the angular range shown, because they are essentially of the same order of magnitude (see in particular FIG. 2B).

If one compares the contributions to $\beta_2$ of the plate rotation with the $\beta_2$-contributions of the change in length of the grating compressor, these are also in a comparable order of magnitude.

As shown in FIGS. 3A to 3D, the ratio of the dispersion orders changes significantly less than $\beta_2$ itself, especially for small grating constants when the glass plate is rotated. In the FIGS. 3C and 3D, a relative delta—rel. $\Delta(\beta3/\beta_2)$ or rel. $\Delta(\beta4/(\beta2)$—is exemplarily shown as a value that characterizes the relation of the dispersion orders. For example, the relative delta $\Delta(\beta3/\beta2)$ is given by:

$$\left(1-\frac{\beta_3/\beta_2}{\beta_{3,0}/\beta_{2,0}}\right)*100\%$$

As rotating the glass plate has approximately the same effect as changing the grating distance, a change in the spacing can be replaced by a change in the angle of rotation during dispersion adjustment. The glass plate can therefore be used to set or control the pulse duration/pulse shape, especially for small grating constants.

Figure 4A:
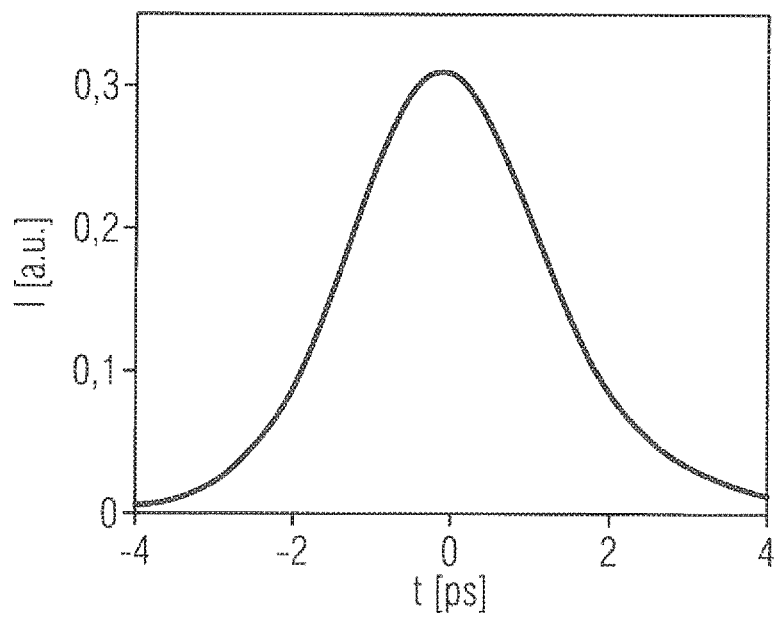
FIGS. 4A-4B are graphs that show exemplary calculations of intensity curves to illustrate the dispersion adjustment.
Figure 4B:
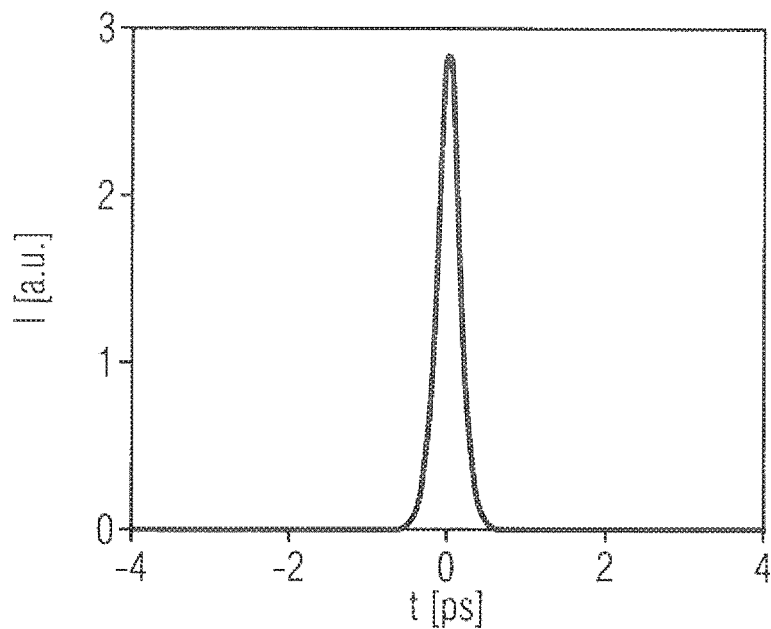
Figure 5A:
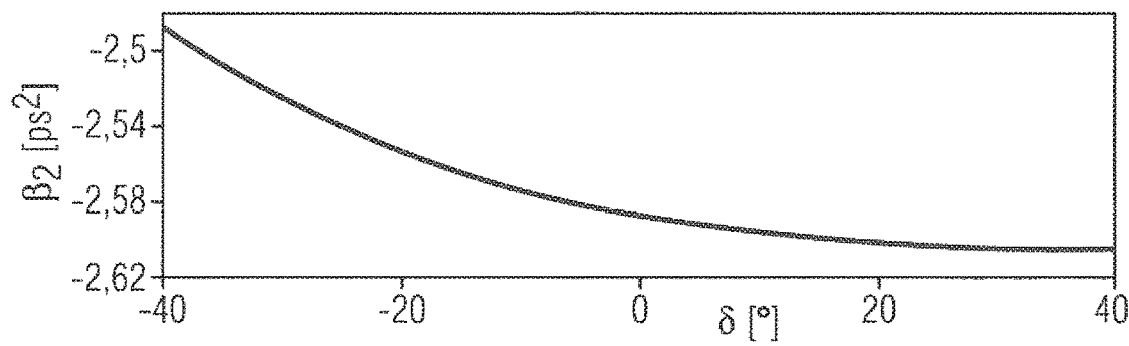
FIGS. 5A-5D are graphs that show exemplary calculations of rotation angle dependent dispersion orders for a large grating constant.
Figure 5B:
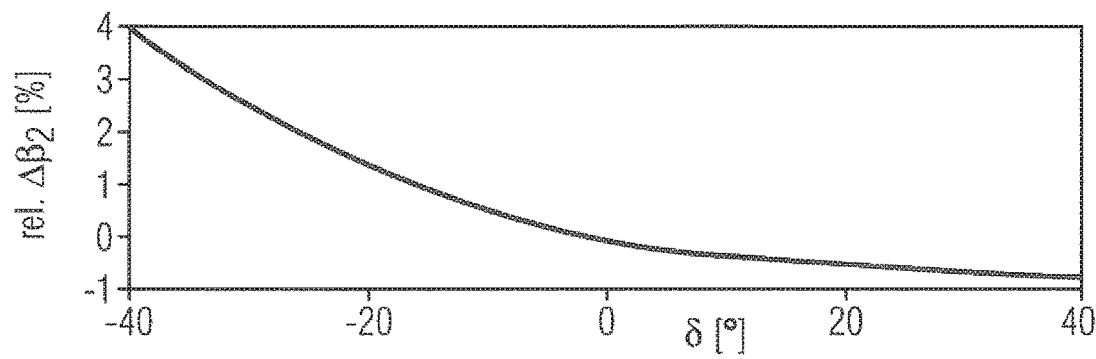
Figure 5C:
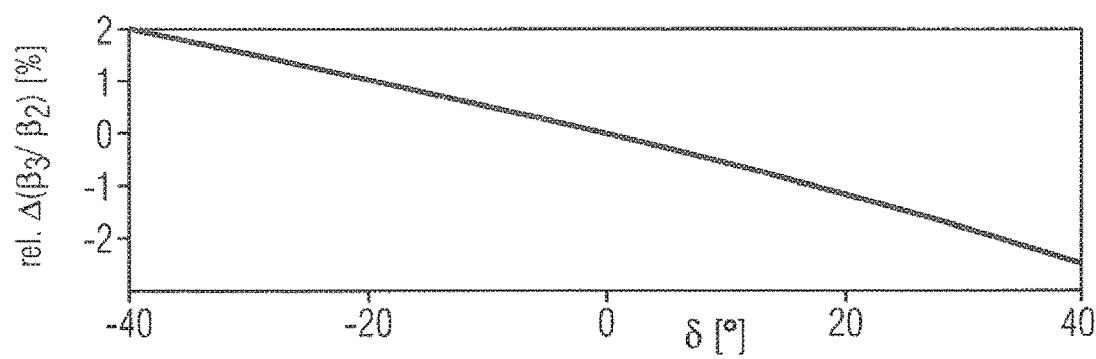
Figure 5D:
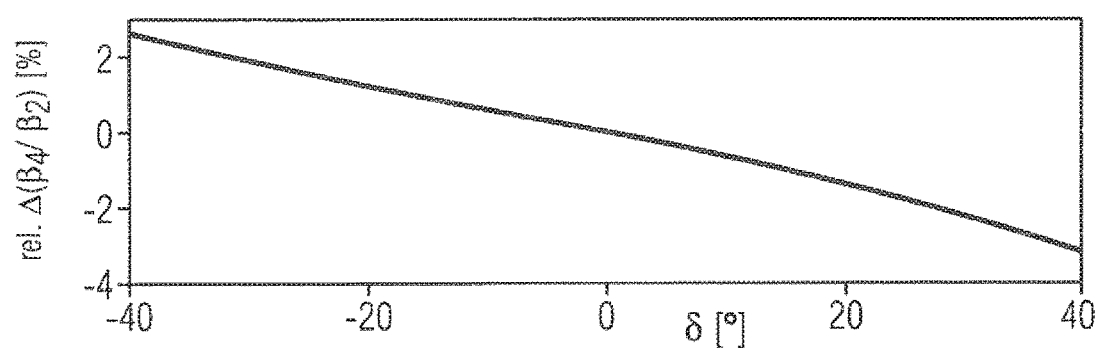

FIGS. 4A and 4B illustrate an exemplary calculation for pulse compression of a pulse whose spectral width enables a minimum possible duration of 300 fs. FIG. 4A shows an intensity curve for a setting of the dispersion adjustment unit in which the compressor has a non-optimal orientation of the glass plate or a non-optimal distance between the gratings. By optimizing the angular position of the glass plate, the pulse duration can be compressed considerably, as is shown in the intensity curve of FIG. 4B.

For very short pulses with high spectral widths, the pulse quality (especially the pulse duration and the pulse shape) reacts sensitively to the higher orders $\beta_3$, $\beta_4 \ldots$ of $\beta$. Already when rotating the glass plate in only a small angular range, the pulse duration can vary, such that the optimization of the pulse quality becomes a further suitable application of the concepts disclosed herein, especially for large grating constants and (ultra-) short pulses.

For large grating constants, the ratio of $\beta_2$ to the higher orders $\beta_3$, $\beta_4$ ... changes much more strongly than for small grating constants. This is illustrated in FIGS. 5A to 5D, in which, analogous to FIGS. 3A to 3D, exemplary angular dependencies of $\beta_2$ and the relative ratios to $\beta_2$ for a grating constant of 588 nm are illustrated. The contributions to the higher orders can now further be used to optimize the pulse quality by adjusting the angle of incidence, i.e., the rotation of the glass plate, and the distance between the compressor gratings.

Figure 6:
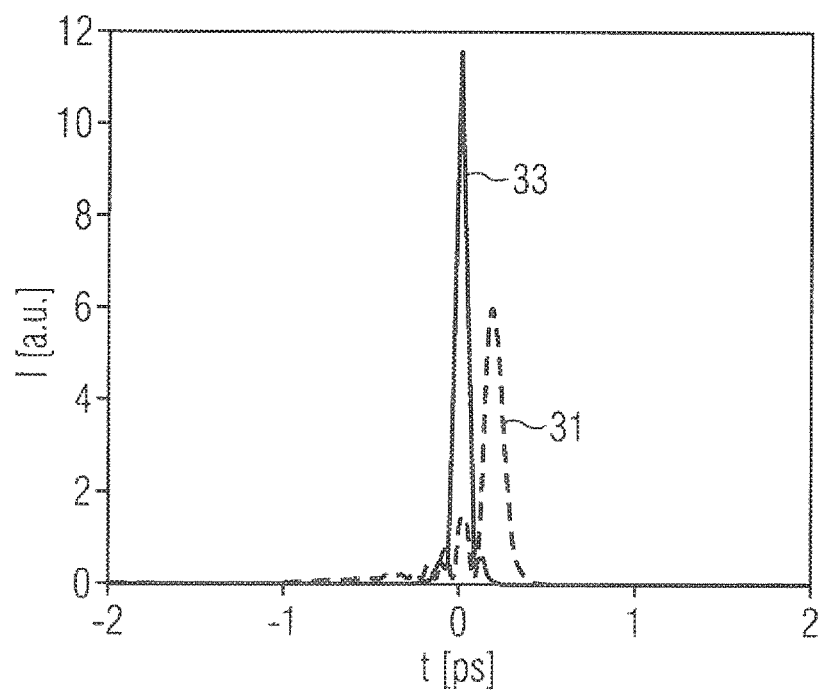
FIG. 6 is a graph that shows exemplary calculations of intensity curves to illustrate pulse shaping.

FIG. 6 shows an exemplary calculation for a non-optimal tuning of a stretcher-compressor-system during the compression of a pulse with a spectral width that would enable a minimum achievable pulse duration of 70 fs. Without using a glass plate, the dotted line 31 shows an intensity curve that is the result of pulse compression based purely on compressor distance adjustment. For example, this results in a pulse duration of about 120 fs after the compressor without a glass plate. If the system is supplemented with a glass plate in the compressor in line with the invention, and both the distance between the compressor gratings and the rotational angle δ of the glass plate are optimized, the pulse duration can be further reduced, e.g., to less than 80 fs, as shown by the continuous line 33 of an exemplarily calculated intensity curve.

Coming back to FIG. 1, the laser system 1 includes the control unit 13 and the pulse duration measuring device 15, and the optical unit 4 includes the angle adjustment device 17 for setting the angular position of the optical element 11 in dependence of a pulse duration measurement.

For example, the pulse duration measuring device 15 is configured to output a pulse duration-dependent measurement signal (e.g., an autocorrelation signal). For example, the pulse duration measuring device 15 is supplied with a (non-reflected) portion of the output beam 10 picked up at a mirror 19. The pulse duration measuring device 15 transmits the measuring signal to the control unit 13, which outputs a control signal to the angle adjustment device 17. For example, the control unit 13 uses an optimization algorithm to vary the angular position (and possibly the distance of the dispersive elements) for a reduction of the pulse duration, and to set the pulse duration to the shortest pulse duration or a pulse duration (or pulse shape) required for a specific material processing application.

The angle adjustment device 17 can be, for example, a motorized and/or via a piezo control element rotatable holder of the optical element, which allows an, especially step-free, adjustment of the rotation angle S. This allows, for example, a setting, in particular a control, of the pulse duration by an actively set, in particular controlled, adjustment of the rotation angle.

Figure 7:
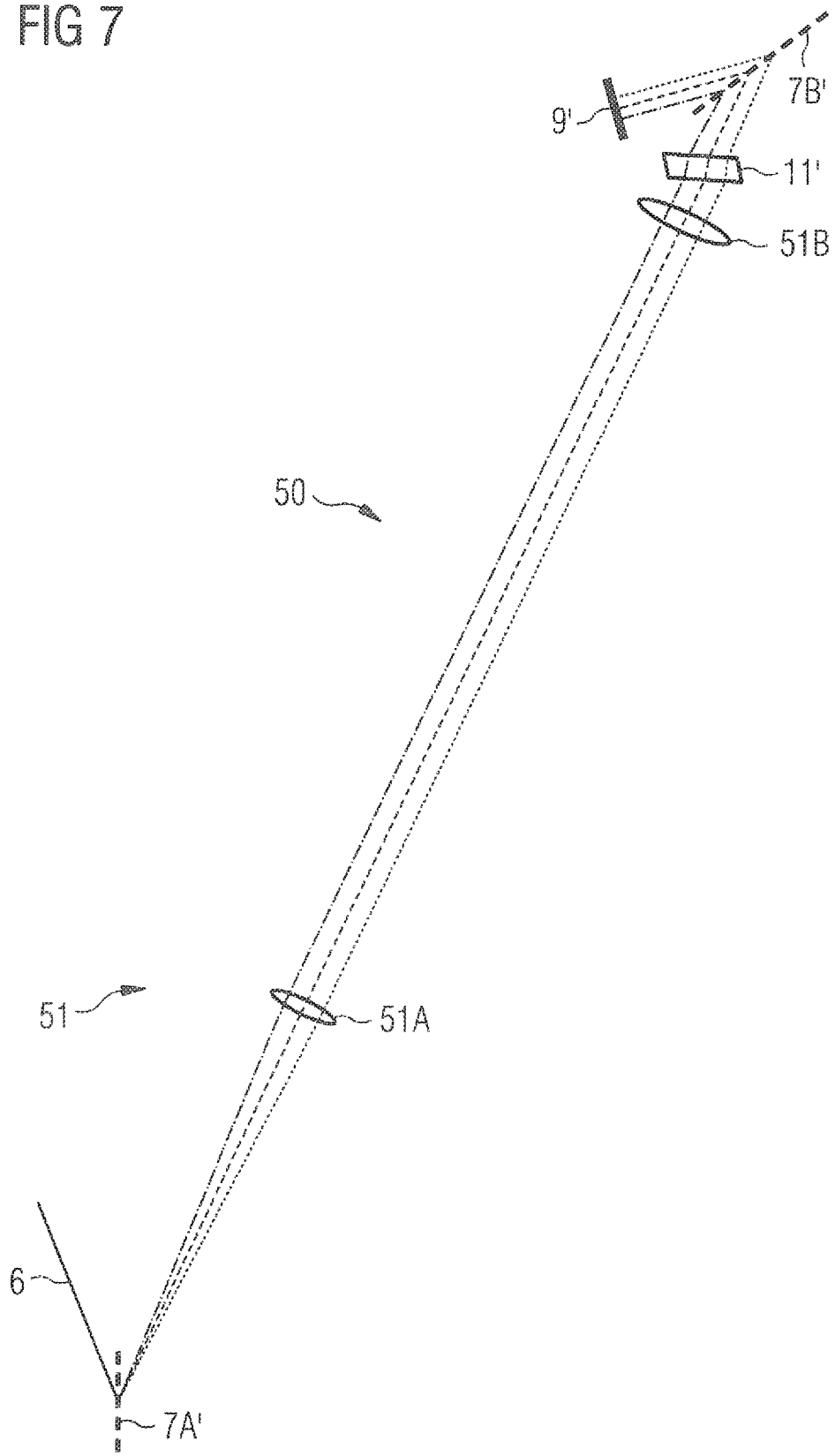
FIG. 7 is a schematic illustration of a dispersion adjustment unit based on a rotatable glass plate for pulse duration stretching (stretcher) as described herein.

FIG. 7 shows an exemplary implementation of the concepts of dispersion adaptation disclosed herein in a dispersion adjustment unit 50 configured as a grating stretcher. To achieve inverted angular dispersion contributions in a grating stretcher, a lens system (e.g., a telescope set-up) can be provided between the interaction regions on the at least one dispersive element, whereby, for example, two transmission gratings 7A', 7B' are shown in FIG. 7. As for compressors, the at least one dispersive element can alternatively be configured as a reflection grating, prism, or grism.

The set-up focusing the laser beam produces an image of the first grating so that the fanned out spectral components converge. As an example a telescope set-up 51 with two lenses 51A, 51B is shown in FIG. 7. An optical element 11', configured as a plane-parallel plate, is inserted in front of the second grating 7B' after telescope set-up 51. Like the plate 11 in FIG. 1, it is rotatably mounted and can be adjusted with regard to the angle of incidence to adapt the dispersion behavior of the stretcher set-up.

As in FIG. 1, the dispersion adjustment unit 50 is folded with a reflector element 9'. In contrast to the compressor arrangement of FIG. 1, the optical element 11' is arranged in a converging fanned-out area. Alternatively or additionally, an optical element can further be placed in front of the first lens 51A. The focusing set-up can also include one or more lenses and/or mirrors.

The dispersion aspects described above with regard to the compressor set-up can be transferred to the stretcher set-up, in particular the functional principle and the possible applications for the adjustment of the pulse duration and the pulse shape.

FIGS. 8A to 8C show further embodiments of rotatably mounted optical elements for optical units that can be used in stretcher and compressor set-ups.

FIG. 8A illustrates an optical wedge pair 35 (double wedge structure). Optical wedges are known from ultra-short optics, for example. The optical wedge pair 35 is an example of a multi-wedge arrangement. Wedges 35A, 35B are, for example, identical. The optical wedge pair 35 can be used as a rotatable optical element of an optical unit 4. The wedges 35A, 35B each have two plane side surfaces that converge at an acute angle. The wedges 35A, 35B are arranged in the fanned-out beam path in such a manner that respectively one of the side surfaces of the wedges acts as the incidence surface 11A or exit surface 11B of the optical element that are parallel to each other. The other sides form a thin air gap 37 between the wedges with, for example, a substantially constant thickness.

At least one of the wedges 35A, 35B is mounted (e.g., on a linear sliding table) to be movable (arrow 39), so that the thickness of the wedge pair 35 can be adjusted depending on the insertion position of the wedges 35A, 35B and that accordingly the insertion can be used as a further setting variable for dispersion adjustment. The angle setting is adjusted by turning the entire double wedge 35 (arrow 41A).

In some embodiments, the double wedge can be used as a special embodiment of a glass plate, whereby the two wedges can be rotated together around an identical angle.

Multi-wedge arrangements are also a way of creating an embodiment in which no mechanical rotation of the optical element is required. This is explained below as an example in connection with FIG. 10. Other embodiments that do not require mechanical movement are described in connection with FIG. 11 exemplarily and are based, for example, on a change in the refractive index with an electro-optic modulator (EOM) or a birefringent crystal, for example.

Returning to optical units with rotatable optical elements, FIG. 8B shows another embodiment that allows the angular dispersion to be left essentially unchanged in an initial position. For this purpose, the optical unit includes a pair of identical, e.g., plane-parallel, transmitting plates 43A, 43B, which can be rotated in opposite directions (arrows 41B, 41B). Thereby, the parallel offset of the first plate 43A can be compensated by the second plate 43B with an appropriate orientation (illustrated in dashes in FIG. 8B), so that in this position the dispersion is determined solely by the distance between the, e.g., gratings and the material dispersion of the plates 42A, 43B.

FIG. 8C shows a further set-up of two plane-parallel plates 45A, 45B, but of different thickness and/or material. For example, a thin plate 45A can be used for fine-tuning of dispersion properties and a thick plate 45B can be used for coarse adjustment. The dispersion is again set by turning one or both plates 45A, 45B (arrows 47A, 47B).

The embodiments shown in FIGS. 8A to 8C are examples of optical units including a plurality of optical elements that together provide plane-parallel incident and exit surfaces and accordingly maintain the spectral propagation directions before and after the optical unit.

Further configurations of dispersion adjustment units include, for example, unfolded set-ups with two pairs of dispersive elements, one optical unit being located in at least one of the fanned-out areas. In addition, stretcher and compressor set-ups can be adapted to each other, especially with regard to the optical elements.

Examples of laser systems in which the dispersion adjustment units proposed herein can be used include laser systems with pulse energies of, e.g., 0.1 µJ and higher, and pulse durations in the range of, e.g., 50 ps and shorter. The application fields of such laser systems include glass cutting (e.g., cutting of displays and medical products), marking, and medical applications such as eye surgery, drilling of injection nozzles, and carrying out scientific experiments.

Based on the concepts disclosed herein, a method for dispersion adjustment may include the following steps shown in FIG. 9.

An angular dispersion portion is provided by spectral fanning and combining of a pulsed laser beam (step 61). By introducing an optical element in the fanned-out area of the pulsed laser beam (step 63), the angular dispersion portion is influenced, e.g., via a plane-parallel plate, a multi-wedge structure, EOM, etc. In particular, the material dispersion by the introduced optical element can also be considered in the dispersion analysis. An optical element in the form of a plane-parallel plate, for example, is rotatably mounted and, thus, adjustable in its angular position relative to the laser beam. If, in addition, a pulse duration of the laser pulse is measured after the dispersion adjustment (step 65), the optical element can, for example, be adjusted in the angular position as a function of the measured pulse duration to adjust the dispersion (step 67). This allows in particular a shortening or stretching of the pulse duration as well as pulse shaping due to the variously combinable dispersion contributions in the dispersion adjustment unit. Moreover, the dispersion adjustment can be carried out together with or in addition to an angular dispersion adjustment.

Furthermore, control concepts can be implemented in systems where, for example, dispersive boundary conditions vary reproducibly as a function of the required pulse energies, e.g., due to self-phase modulation. For example, the control concepts can include adjusting the optical unit, e.g., the angular position of the optical element or the voltage applied to the EOM, as a function of the required pulse energy. Accordingly, the pulse duration measurement mentioned above can be replaced or supplemented by the provision of a pulse energy parameter. For example, for pulses with B-integral values smaller than 1 rad (essentially no self-phase modulation), an almost orthogonal incidence onto the optical element can be set. As the pulse energy increases, the optical element is then rotated to compensate for the dispersive effects on the pulse duration.

In addition, changing the propagation direction and/or the propagation length can cause a parallel offset of the individual spectral components of the electromagnetic radiation with respect to the propagation of the individual spectral components. The parallel offset depends on the incidence angle. In particular, for changing the dispersion produced in the angular dispersion region, the propagation direction and/or the propagation length can be changed by rotating the optical element and/or by changing a thickness and/or the refractive index and/or the diffraction parameter of the optical element.

The methods can include the following steps: measuring a pulse duration of the laser pulse after dispersion adaptation and setting the propagation direction and/or the propagation length within the optical element, e.g., the angular position, as a function of the measured pulse duration for adaptation of the dispersion, e.g., for shortening or stretching the laser pulses. The methods can also include the following steps: providing a self-phase modulation dispersion contribution parameter, e.g., a pulse energy parameter, and changing the propagation direction and/or the propagation length as a function of the self-phase modulation dispersion contribution parameter, e.g., for compensating the stretching of laser pulses caused by self-phase modulation.

In general, an adjusting device of the optical element can be configured to set a dispersion contribution of the dispersion adjustment unit as a function of a pulse duration-dependent measurement signal, an average pulse power parameter, a peak pulse power parameter, and/or a pulse energy parameter. This may be done in particular for assigning a self-phase modulation dispersion contribution of the optical beam path before and/or after the dispersion adjustment unit.

In some embodiments, the thickness of the optical element can be selected, for example, in such a manner that the pulse length can be minimized without a change in distance of the grating pair, for example. In general, the required thickness depends on parameters of the different optical components of the dispersion adjustment unit. For example, it depends on the implemented dispersive angular fanning, e.g., caused by the vertical line spacing of the gratings, on the angle of incidence (the effective thickness is influenced by almost orthogonal incidence or oblique incidence, e.g., at the Brewster angle with respect to the central wavelength). In addition, the required thickness depends on laser beam parameters such as the duration of the laser pulses, the spectral width of the laser pulses, the laser pulse energy, the tendency of the optical system to have self-phase modulation, etc.

Figure 10:
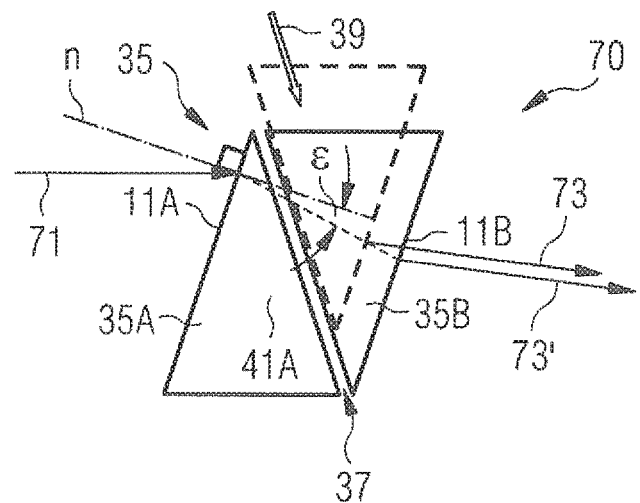
FIG. 10 is a schematic illustration of a further optical unit based on a double wedge structure for a dispersion adjustment unit as disclosed herein.

FIG. 10 further shows that a change in thickness of a multiple wedge arrangement, exemplarily shown for a double wedge structure 70 according to FIG. 8B, leads to an incidence angle dependent parallel offset of the individual spectral components of the electromagnetic radiation with respect to the propagation of the individual spectral components before and after the optical unit.

Specifically for two thicknesses it is shown that for an incident spectral component with an optical path 71, which does not run perpendicular to the incidence surface 11A of the wedge 35A, a beam offset is caused by the slanted passing through the wedges 35A, 35B under an angle ε(≠0) with respect to the normal n to the incidence surface 11A, the beam offset depending on the thickness of the double wedge structure 70. The thicker the double wedge structure 70 is set, the further an exiting optical path 73, 73' is displaced parallel with respect to the incident optical path 71. As different spectral components in the angular dispersion region are associated with optical paths running at an angle to one another, the angle ε varies and so does the parallel beam offset, so that a change only in the thickness of the optical element (due to a displacement along the arrow 39 in FIG. 10) leads to a change in the angular dispersion and accordingly enables a dispersion adjustment. In addition, as explained above, the offset has further phase effects, such as different paths between the second interaction area and the back reflector, etc.

Further embodiments of multi-wedge structures with three or more wedges that are known to the skilled person can be implemented by analogy as long as the required optical conditions are met.

In further embodiments, optical elements can be used in the optical unit 4, the optical properties of the optical elements such as refractive index and birefringence being specifically controllable.

Figure 11:
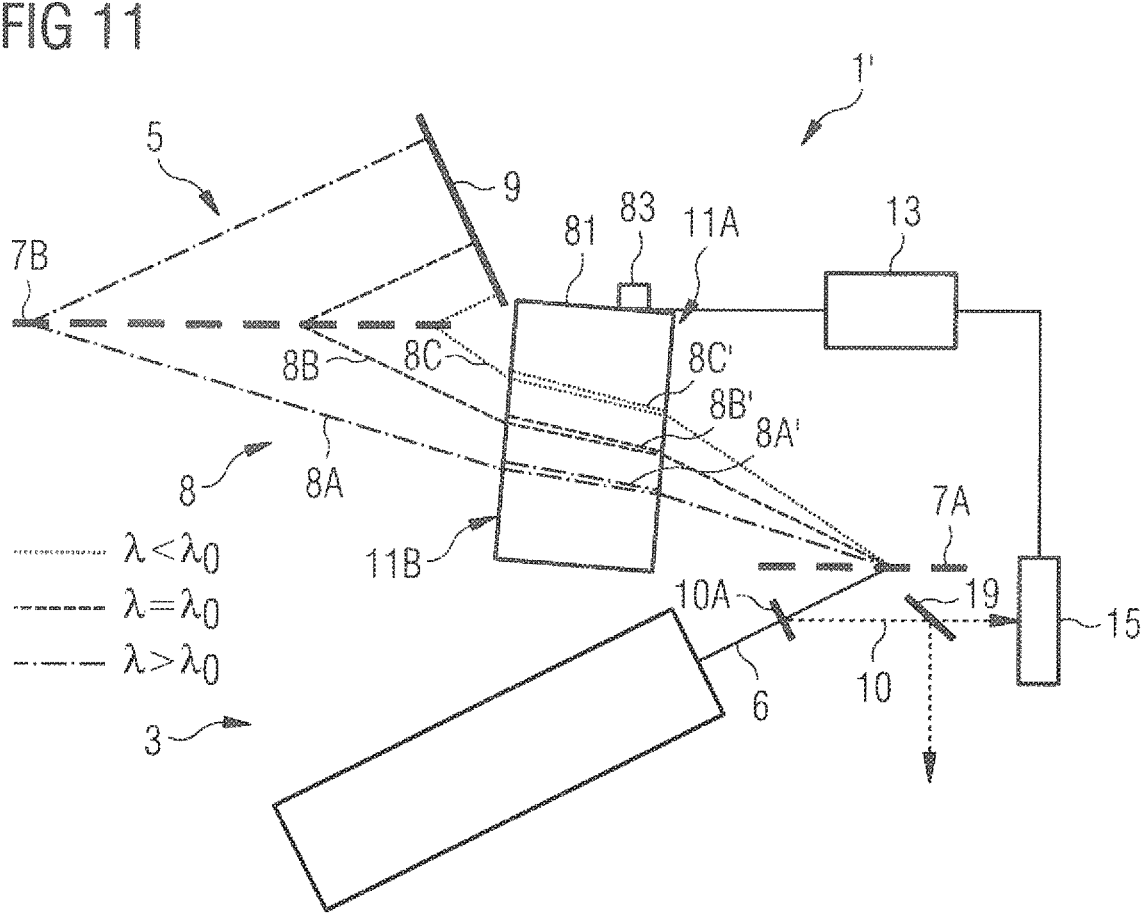
FIG. 11 is a schematic illustration of a laser system with a dispersion adjustment unit based on an electro-optical modulator for pulse duration compression as described herein.

FIG. 11 shows a laser system 1' with a structure similar to that shown in FIG. 1. Instead of the plate 11, however, an electro-optical modulator (EOM) 81 with electrodes 83 is provided. The voltage applied to the electrodes 83 can be adjusted with the control device 13. Depending on the voltage, a specific refractive index is set in the EOM 81. The specific refractive index determines the optical paths 8A, 8B, and 8C in the angular dispersion region 8. If one changes the voltage and thus the refractive index, the optical paths also change. This is illustrated exemplarily in the EOM 81 by optical paths 8A', 8B', 8C'. The voltage setting of the EOM 81, for example, can allow faster adjustment of the dispersion compared to the mechanical rotation or slide-in setting. Furthermore, due to the fixed spatial integration, one can use an anti-reflection coating optimized for the angle of incidence. With regard to the remaining components and the effect of the change in optical paths, reference is made to the foregoing description.

In other embodiments, for an alternative analog configuration, set-ups of two acousto-optical modulators can be used as optical elements to adjust the optical paths.

Figure 12:
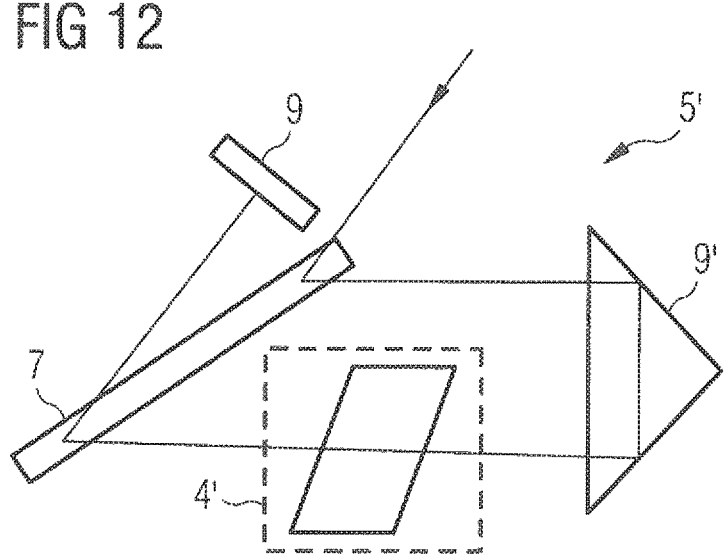
FIG. 12 is a schematic illustration of a laser system with a dispersion adjustment unit based on a single dispersive element for pulse duration compression as disclosed herein.

FIG. 12 shows a dispersion adjustment unit 5', which can be used instead of the dispersion adjustment units 5 in the laser systems 1 or 1', for example. The dispersion adjustment unit 5' is exemplarily configured as a compressor, but can also be configured as a stretcher. It has an optical unit 4' with an optical element for dispersion adjustment as disclosed herein. As in FIG. 1, for example, the dispersion adjustment unit 5' includes the back reflector 9, which displaces the way there from the way back in height. A second folding takes place via a deflection prism 9', so that only one dispersive element 7 is required. This is because the second folding can provide spatially separated interaction regions between laser radiation and the dispersive element 7 on the (one) dispersive element 7. This results in a compact optical set-up.

The exemplary embodiments were described with reference to laser light, particularly in the extended spectral range of ultra-short pulse lasers (usually in the wavelength range from 200 nm to 10 μm depending on the application). However, usage is generally transferable to electromagnetic radiation having a spectral width, provided that the concept of angular dispersion variation can be implemented.

The embodiments of dispersion adjustment units described herein may also be used in single or multi pass and/or for oscillator systems with free beam compressors and/or stretchers.

As can be seen from the embodiments described herein, the optical element can be adjusted, e.g., independently of the at least one dispersive element in its position and/or orientation with respect to the at least one dispersive element.

As can also be seen from the embodiments described herein, the optical element, in particular the one or more plane-parallel (glass) plates or the optical wedges, preferably consists of a material with a refractive index homogeneously formed throughout the optical element, in particular in the region of the beam passage. The homogeneity of the refractive index is such that the deflection of the light is not influenced by changes in the refractive index in the material when, for example, the optical element is rotated. In particular, the parallel offset is not influenced/disturbed by a change in the refractive index in the material itself when the rays pass through the, e.g., plane-parallel (glass) plates with a correspondingly homogeneously provided refractive index.

All features disclosed in the description and/or the claims are intended to be disclosed separately and independently from each other for the purpose of original disclosure as well as for the purpose of restricting the claimed invention independent of the composition of the features in the embodiments and/or the claims. All value ranges or indications of groups of entities disclose every possible intermediate value or intermediate entity for the purpose of original disclosure as well as for the purpose of restricting the claimed invention, in particular as limits of value ranges.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A dispersion adjustment unit for electromagnetic radiation having a spectral width, comprising:
    at least one dispersive element comprising one or more of an optical grating, a prism, or a grism, wherein the at least one dispersive element is configured and arranged to generate angular dispersion in an angular dispersion region, delimited by a first interaction region and a second interaction region where the electromagnetic radiation interacts with the at least one dispersive element,
        wherein after the electromagnetic radiation interacts with the first interaction region individual spectral components of the electromagnetic radiation fan out along optical paths that run at an angle to one another; and
        wherein after the electromagnetic radiation interacts with the second interaction region, the optical paths of the individual spectral components of the electromagnetic radiation are parallelized, yet remain displaced from one another; and
    an optical unit arranged within the angular dispersion region and comprising an optical element transmitting the electromagnetic radiation, wherein the optical element produces an incidence angle dependent parallel offset of the individual spectral components of the electromagnetic radiation with respect to the propagation of the individual spectral components before and after the optical unit.

2. The dispersion adjustment unit of claim 1, wherein the optical unit has a plane incidence surface and a plane exit surface that are arranged parallel to each other.

3. The dispersion adjustment unit of claim 2, wherein with respect to the incidence surface and the exit surface, an incidence angle and an exit angle of the optical paths of individual spectral components are identical due to the substantial parallelism of the incidence surface and the exit surface.

4. The dispersion adjustment unit of claim 2, wherein the incidence surface and the exit surface are arranged at a distance from each other, and wherein the material of the optical element has a thickness of at least about 0.1 mm to about 10 mm.

5. The dispersion adjustment unit of claim 2, wherein the optical element is rotatably mounted with respect to the beam path for adjusting the angular position of the optical element, so that an incidence angle and an exit angle of the optical paths are adjustable with respect to the incidence surface and the exit surface of the optical element, respectively.

6. The dispersion adjustment unit of claim 2, wherein at least one of the incidence surface and the exit surface comprises an antireflection coating.

7. The dispersion adjustment unit of claim 1, wherein the optical element comprises at least one plane-parallel plate or a pair of oppositely displaceable wedges.

8. The dispersion adjustment unit of claim 1, wherein the optical unit further comprises an adjusting device configured to change the parallel offset of the individual spectral components.

9. The dispersion adjustment unit of claim 8, wherein the adjusting device is configured to change the spatial orientation of the optical element in the angular dispersion region for changing the parallel offset.

10. The dispersion adjustment unit of claim 8, wherein the optical element comprises at least one plane-parallel plate, which has a planar incidence surface and a planar exit surface that are arranged parallel to each other, and the adjusting device is configured to change an angular position of the at least one plane-parallel plate for changing the parallel offset.

11. The dispersion adjustment unit of claim 8, wherein the optical element comprises a multi-wedge device and the adjusting device is configured to change at least one of a thickness and an angular position of the multi-wedge device for changing the parallel offset.

12. The dispersion adjustment unit of claim 8, wherein the optical element comprises an electro-optical modulator and the adjusting device is configured to change a refractive index of the electro-optical modulator for changing the parallel offset.

13. The dispersion adjustment unit of claim 8, wherein the optical element comprises a pair of acousto-optical modulators, and the adjusting device is configured to change a diffraction parameter of the pair of acousto-optical modulators for changing the parallel offset.

14. The dispersion adjustment unit of claim 8, wherein the adjusting device is configured to set a dispersion contribution of the dispersion adjustment unit in dependence on at least one of a pulse duration-dependent measurement signal, a pulse power parameter, a peak pulse power parameter, and a pulse energy parameter.

15. The dispersion adjustment unit of claim 1, wherein the optical element is adjustable independently of the at least one dispersive element in at least one of its positions and orientations in the beam path with respect to the at least one dispersive element.

16. The dispersion adjustment unit of claim 1, wherein the optical element is mounted rotatably about a rotation axis running essentially perpendicularly to a fan-out-plane spanned by the optical paths extending at an angle to one another.

17. The dispersion adjustment unit of claim 1, wherein the optical element has a plane incidence surface and a plane exit surface arranged parallel to one another and perpendicular to a fan-out-plane spanned by the optical paths extending at an angle to one another.

18. The dispersion adjustment unit of claim 1, wherein the material of the optical element is quartz, YAG, sapphire, or SF 10.

19. The dispersion adjustment unit of claim 1, wherein a rotation of the optical element or a changing of at least one of a thickness, a refractive index, and a diffraction parameter of the optical element causes a change of the dispersion produced by the dispersion adjustment unit with a constant position of the at least one dispersive element or with a substantially constant distance between the interaction regions.

20. The dispersion adjustment unit of claim 1, further comprising:
at least one focusing element forming an optical telescope arranged between the interaction regions of the at least one dispersive element, wherein the optical element is arranged in the beam path section between one of the focusing elements and the adjacent interaction region of the at least one dispersive element, or
a reflection element or a roof edge mirror or a deflection prism for back reflection of the optical paths with a parallel displacement in one direction, wherein the reflection element or the roof edge mirror or the deflection prism is arranged between the interaction regions of the at least one dispersive element.

21. The dispersion adjustment unit of claim 1, wherein the optical unit comprises a plurality of optically transmitting plates, which are rotatably mounted in the beam path between the interaction regions of the at least one dispersive element and are arranged rotated in the same direction or in opposite rotation directions in the beam path.

22. The dispersion adjustment unit of claim 1, further comprising any one or more of:
an optical folding element, a deflection prism, or a deflection mirror unit, for guiding the beam path back through the interaction regions of the at least one dispersive element and the optical unit; and
a second pair of interaction regions of at least one further dispersive element with another optical unit correspondingly arranged in the beam path.

23. The dispersion adjustment unit of claim 1, wherein the at least one dispersive element comprises at least one of (i) one or more optical gratings, (ii) a pair of optical gratings, (iii) one or more prisms, (iv) a pair of prisms, (v) one or more grisms, and (vi) a pair of grisms.

24. A laser system comprising:
a laser pulse source for generating spectrally wide laser pulses, and
at least one dispersion adjustment unit according to claim 1.

25. The laser system of claim 24, further comprising:
a control unit for setting an adjusting device of the at least one dispersion adjustment unit, which is configured for setting at least one of an angular position, a refractive index, a thickness, and a diffraction parameter of an optical element of the at least one dispersion adjustment unit.

26. The laser system of claim 25, wherein the control unit is configured to store a parameter set with which the adjusting device is actuated correspondingly for setting a parameter provided for an application.

27. The laser system of claim 25, further comprising at least one of:
- a pulse duration measuring device that sends a pulse duration-dependent measuring signal to the control unit for setting the adjusting device; and
- a pulse energy parameter output device that provides a self-phase modulation dispersion contribution to the control unit for driving the adjusting device.

28. The laser system of claim 24, further comprising:
an amplifier unit or a fiber laser amplifier, wherein the dispersion adjustment unit is arranged upstream of the amplifier unit or the fiber laser amplifier for pulse stretching or downstream of the amplifier unit or a fiber laser amplifier for pulse compression.

* * * * *